US010662048B2

(12) United States Patent
Bovo et al.

(10) Patent No.: US 10,662,048 B2
(45) Date of Patent: May 26, 2020

(54) GRIPPER FOR FORKLIFTS WITH CLAMPING PANELS ADJUSTABLE IN INCLINATION

(71) Applicant: BOLZONI S.p.A., Casoni Di Podenzano (IT)

(72) Inventors: Nicola Bovo, Ponte dell'Olio (IT); Pietro Foroni, Casalpusterlengo (IT)

(73) Assignee: BOLZONI S.p.A., Casoni Di Podenzano (IT)

( * ) Notice: Subject to any disclaimer, the term of this patent is extended or adjusted under 35 U.S.C. 154(b) by 8 days.

(21) Appl. No.: 15/883,572

(22) Filed: Jan. 30, 2018

(65) Prior Publication Data

US 2018/0222734 A1   Aug. 9, 2018

(30) Foreign Application Priority Data

Feb. 3, 2017   (IT) .................. 102017000012164

(51) Int. Cl.
*B66F 9/18*   (2006.01)
*F16B 2/10*   (2006.01)
(Continued)

(52) U.S. Cl.
CPC .............. *B66F 9/183* (2013.01); *B66F 9/125* (2013.01); *B66F 9/22* (2013.01); *F16B 2/10* (2013.01); *F16B 2/12* (2013.01)

(58) Field of Classification Search
CPC .. B66F 9/183; B66F 9/125; B66F 9/22; F16B 2/12; F16B 2/10; F16F 1/027; F16F 1/18; F16F 3/23; F16F 2238/022
See application file for complete search history.

(56) References Cited

U.S. PATENT DOCUMENTS 2,727,779 A * 12/1955 Phillips ................... B66F 9/183
294/99.1
2,822,209 A * 2/1958 Cichaczewski ......... B66F 9/183
294/99.1
(Continued)

FOREIGN PATENT DOCUMENTS

FR   1 146 439   11/1957
FR   1 499 321   10/1967
(Continued)

OTHER PUBLICATIONS

Italian Search Report dated Sep. 21, 2017 in Italian Application 102017000012164 filed on Feb. 3, 2017 (with English Translation of Categories of Cited Documents).

*Primary Examiner* — Lynn E Schwenning
(74) *Attorney, Agent, or Firm* — Oblon, McClelland, Maier & Neustadt, L.L.P.

(57) ABSTRACT

A gripper for forklifts including a support frame that can be coupled to a forklift and a pair of jaws that are mounted on the support frame in a movable manner with respect to one another between at least one closing position and one opening position respectively for clamping and releasing a product to be transported and vice versa, wherein each jaw includes a support plate-shaped body that is coupled to a mounting body, which is in turn coupled in a movable manner to the support frame, wherein the support plate-shaped body includes a first face that faces the other jaw and a second face opposite the first face, a clamping panel that is supported by the support plate-shaped body to which it is connected with connecting members.

17 Claims, 8 Drawing Sheets

(51) Int. Cl.
*B66F 9/22* (2006.01)
*B66F 9/12* (2006.01)
*F16B 2/12* (2006.01)

(56) References Cited

U.S. PATENT DOCUMENTS 3,643,827 A * 2/1972 Link .................. B66F 9/183
 414/621
6,318,949 B1 * 11/2001 Seaberg .............. B66F 9/184
 294/206

FOREIGN PATENT DOCUMENTS

| | | |
|---|---|---|
| GB | 812990 | 5/1959 |
| JP | 07-048100 | 2/1995 |

* cited by examiner

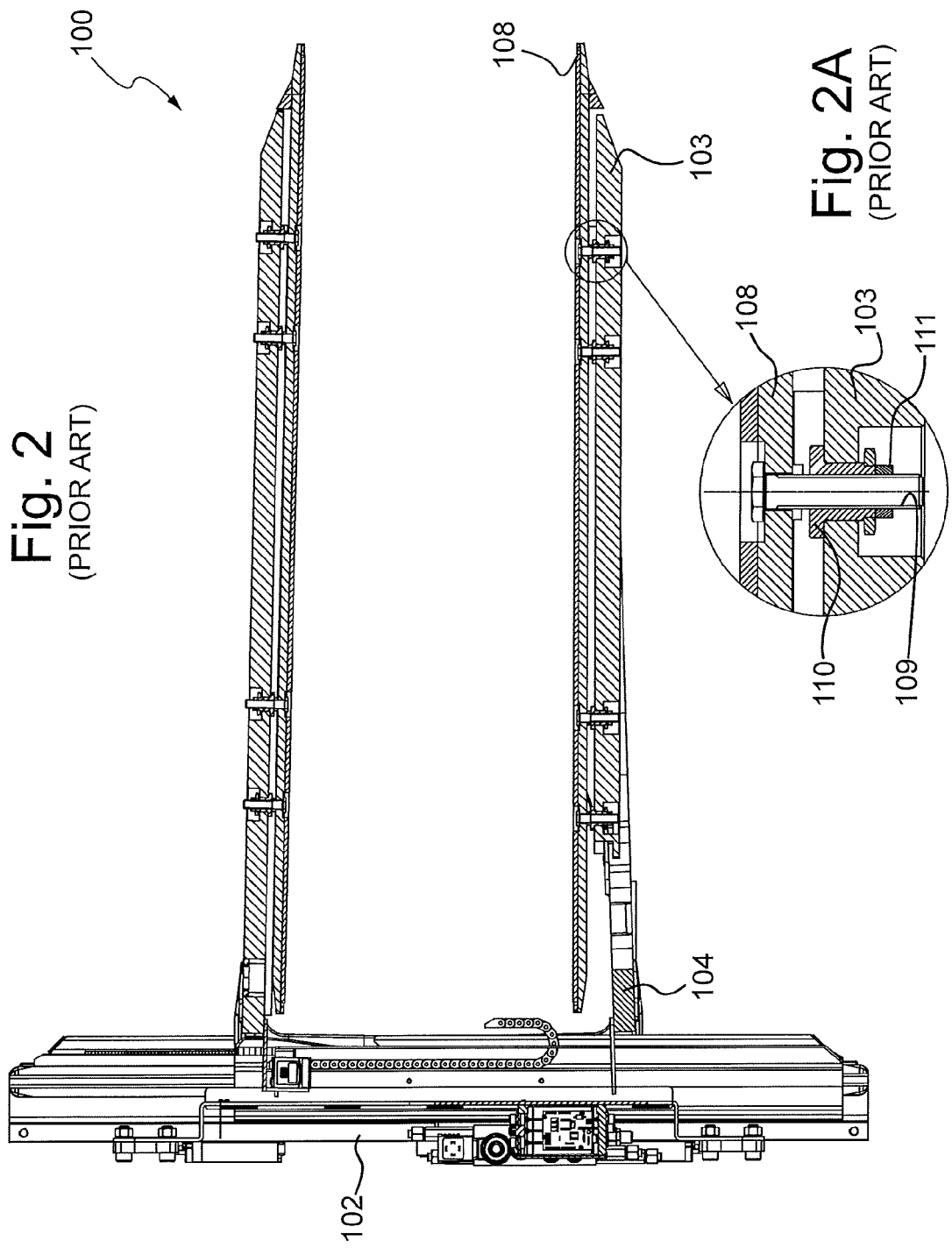

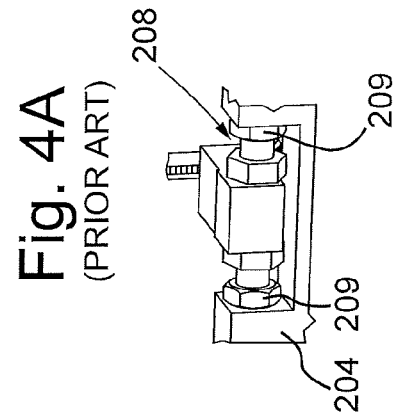
Fig. 4A
(PRIOR ART)
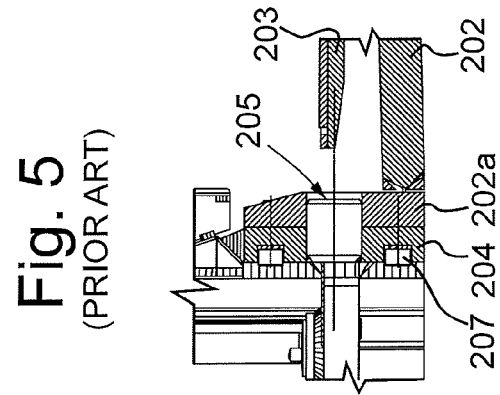
Fig. 5
(PRIOR ART)
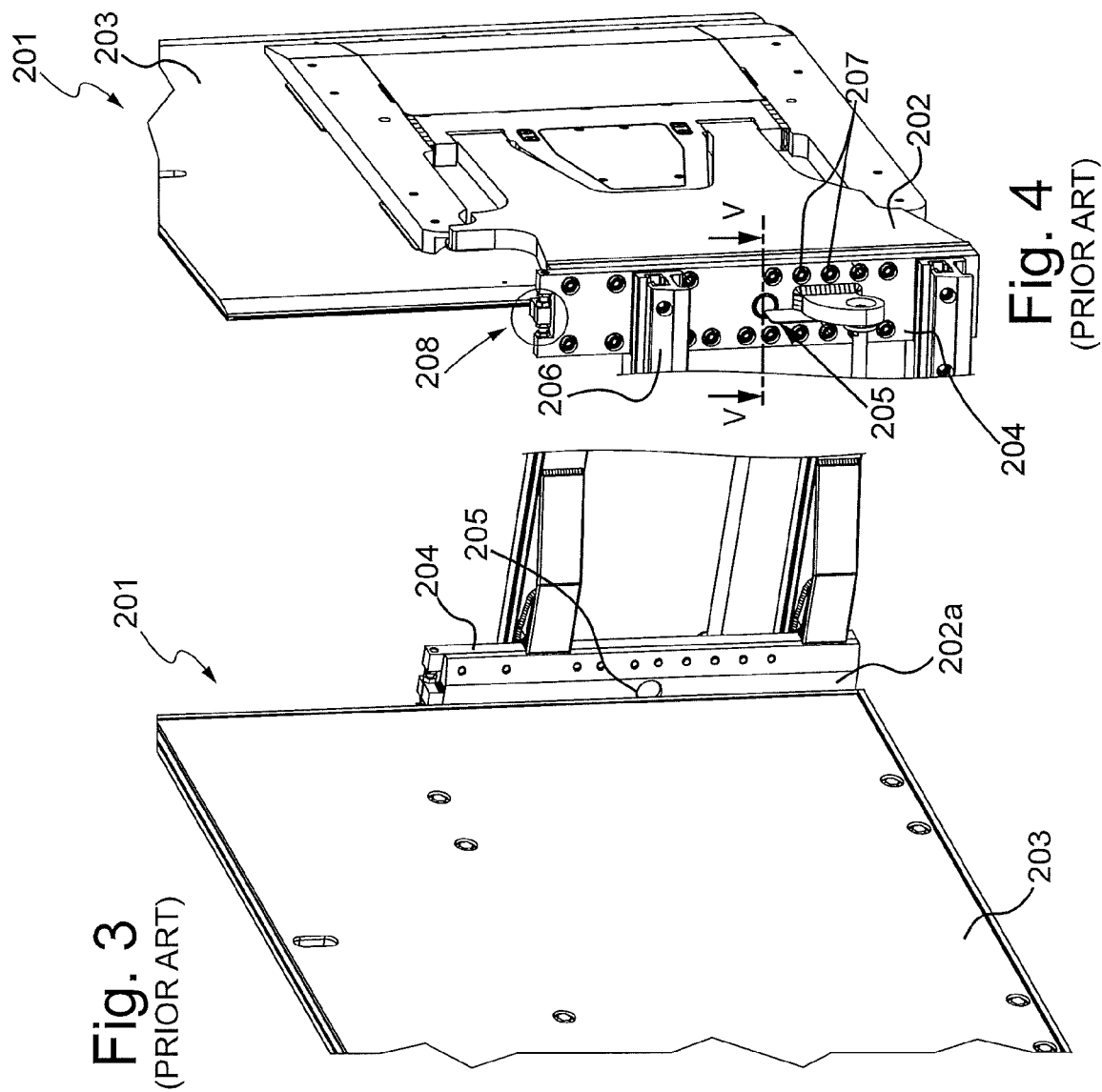
Fig. 3
(PRIOR ART)
Fig. 4
(PRIOR ART)

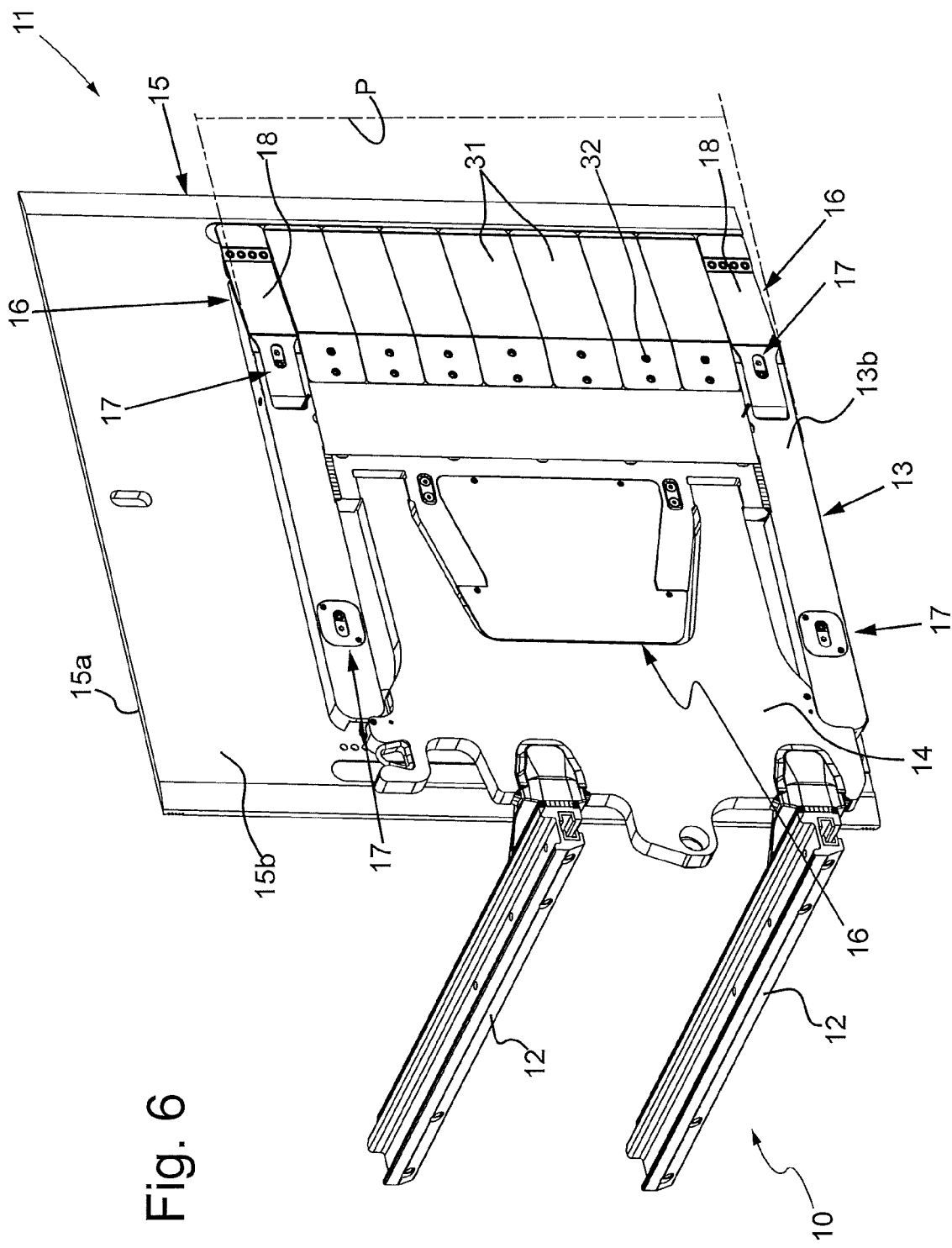

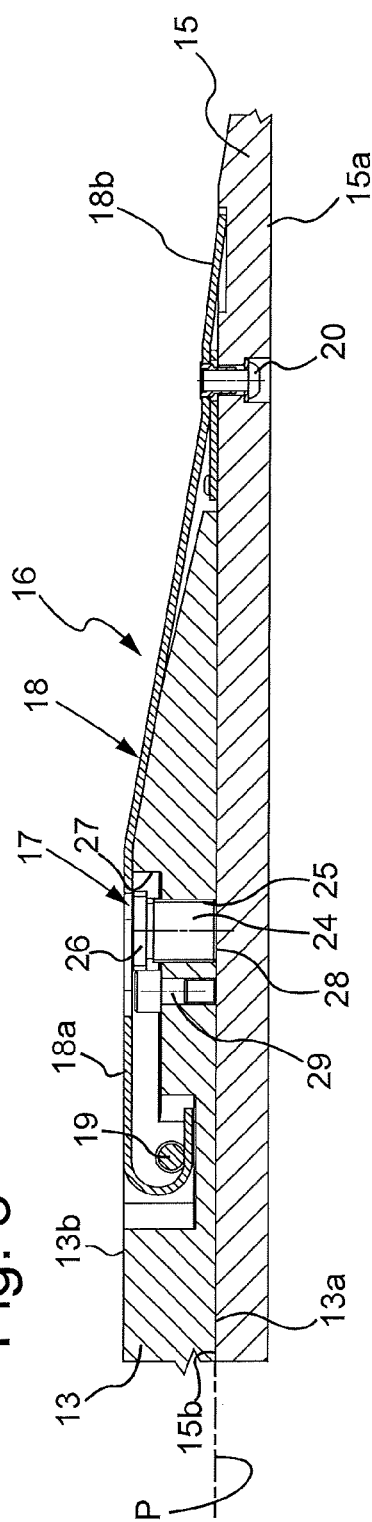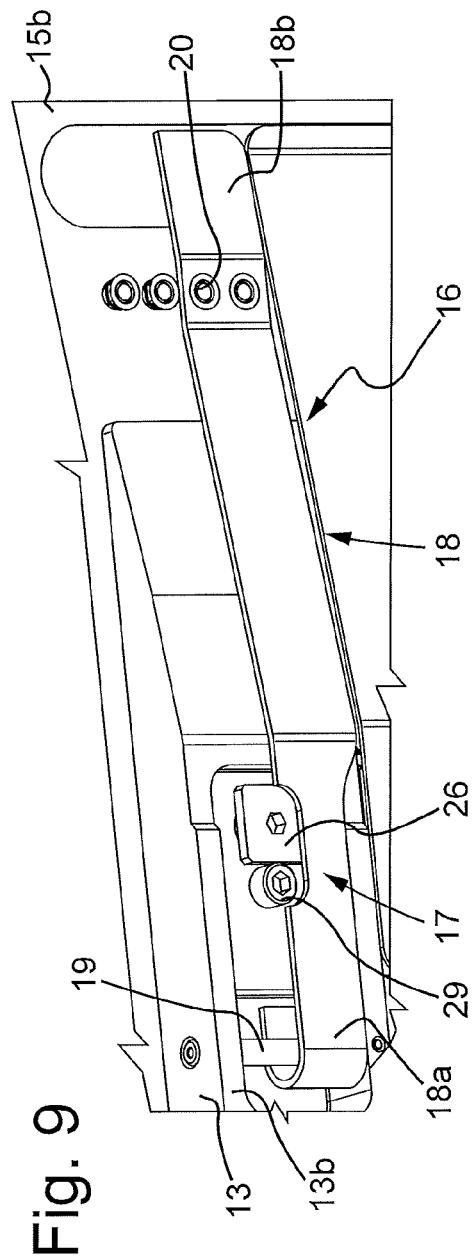

GRIPPER FOR FORKLIFTS WITH CLAMPING PANELS ADJUSTABLE IN INCLINATION

BACKGROUND

The present invention relates to a gripper for forklifts with clamping panels adjustable in inclination.

With particular reference to the field of forklifts, as known, grippers are used which are provided with a pair of jaws movable towards and away from each other respectively to grip and release a load.

In some applications, for example when moving electrical appliances, it is necessary for the distribution of the clamping force exerted by the jaws on the load to be as uniform as possible, so as to avoid concentrations of stresses that could damage the load.

The distribution of the clamping force that the jaws apply to the load depends on the degree of parallelism of the related clamping panels that contact the opposite sides of the load itself.

This parallelism is not ensured by the fabrication tolerances and by the precision of assembly of the jaws of the grippers that, essentially, are metal construction structures.

For this reason, jaws have long been known whose clamping panels are adjustable in position—and, in particular, in inclination—in order to be able to seek and restore their parallelism, also with successive adjustments and tests, and thereby ensure a distribution of the clamping forces that is as uniform as possible also according to the load to be moved.

According to a first embodiment of the prior art shown in figures from 1 to 2A, the gripper 100 comprises a pair of jaws 101 that are mounted on a support frame 102 in a mutually movable manner, for example by sliding, between at least one close configuration for clamping the load to be moved and at least one spaced configuration for releasing the load and vice versa. The support frame 102 can be mounted on forklift. Each jaw 101 comprises a support plate-shaped body 103 that is coupled, for example through a cylindrical hinge coupling, to a mounting body 104. The mounting body 104 is in turn movably coupled to the support frame 102. The mounting body 104 is, for example, fastened to rectilinear section bars 105 slidably inserted in corresponding rectilinear guides 106 fastened to the support frame 102. The sliding motion of the two jaws 101 is achieved through respective linear actuators 107 of the type with hydraulic cylinders-pistons mounted on the support frame 102.

Each jaw 101 further comprises a respective clamping panel 108.

In this first known embodiment, the clamping panel 108 is supported by the respective support plate-shaped body 103 through a plurality of threaded connecting members.

Each threaded connecting member comprises a screw 109 that is rigidly fastened in rotation and translation to the clamping panel 108 and that is engaged in a threaded hole obtained in a corresponding bushing 110. The bushing 110 is mounted in a respective through hole obtained in the support plate-shaped body 103. The bushing 110 is inserted in the respective hole of the support plate-shaped body 103 in a freely rotating manner. A locknut 111 blocks the relative rotation of the screw 109 relative to the corresponding bushing 110. To adjust the inclination of the clamping panel 108 it is necessary to loosen the locknut 111 and, with an appropriate wrench, rotate the bushing 110 so as to impart to the screw 109 engaged therein a corresponding translatory motion with consequent localised displacement of the clamping panel 108 integral therewith.

Since the clamping panel 108 is rigidly fastened to the screws 109, it is necessary to carry out the adjustment gradually, acting individually on each of the threaded connecting members.

If it is necessary to significantly change the inclination of the panel, it is necessary to loosen the screws 109 of all threaded connecting members, so as to avoid the occurrence of localised stresses that could damage the clamping panel 108.

Moreover, between the clamping panel and the respective support plate-shaped body there remains a free space that, in some cases, can damage the load.

According to a second embodiment of the prior art shown in FIGS. 3 to 5, each jaw 201 comprises a support plate-shaped body 202 that supports a respective clamping panel 203, which is connected thereto with connecting members providing a complete rigid connection.

The rear end of the support plate-shaped body 202, i.e. the end thereof oriented towards the support frame of the gripper, is coupled through a cylindrical hinge coupling 205 to a mounting body 204. The mounting body 204 is fixed to rectilinear section bars 206 that are slidably inserted in corresponding rectilinear guides mounted on the support frame of the gripper.

The cylindrical hinge 205 consists of a pin that is fastened to the mounting body 204, extends in orthogonal direction to the plane defined by the rectilinear section bars 206 and is rotatably mounted in a corresponding seat obtained in a wing 202a of the support plate-shaped body 202.

A plurality of bolts 207 fasten in a removable manner the wing 202a, and hence the plate-shaped body 202 integral therewith, to the mounting body 204.

At the upper end of the mounting body 204 screw adjustment members 208 are provided that act on a corresponding projection of the wing 202a.

To change the inclination of the clamping panel 203 it is necessary to loosen the bolts 207 and act on the screw adjustment members 208 so as to cause a corresponding rotation of the wing 202a, and therewith of the support plate-shaped body 202 and of the clamping panel 203 integral therewith, around the cylindrical hinge 205. Once the desired adjustment is obtained, it is necessary to tighten the locknuts 209 of the screw adjustment members 208 and the bolts 207.

The adjustment operations are, therefore, particularly laborious and long.

The structure of the jaws themselves, moreover, is particularly complex, heavy and bulky.

BRIEF SUMMARY

The aim of the present invention is to overcome the drawbacks of the prior art.

Within the scope of this aim, a particular object of the present invention is to provide a gripper for forklifts that makes it possible to adjust the inclination of the respective clamping panels so as to restore their related parallelism in a simple and quick manner, without risks of damaging the clamping panels themselves.

Another object of the present invention is to provide a gripper for forklifts that makes it possible to adjust the inclination of the respective clamping panels with a structure that is constructively simple and has reduced dimensions and weights.

This aim and these objects according to the present invention are achieved by providing a gripper for forklifts with clamping panels adjustable in inclination.

BRIEF DESCRIPTION OF THE DRAWINGS

Further features are highlighted in the dependent claims.

The features and the advantages of a gripper for forklifts with clamping panels adjustable in inclination according to the present invention will become better apparent from the following exemplifying and non-limiting description, referred to the accompanying schematic drawings in which:

FIG. 2 is a schematic cross section view of FIG. 1;

FIG. 2A is an enlarged-scale view of a detail of FIG. 2;

FIGS. 3 and 4 show, respectively in frontal and rear axonometric views, a mounting detail of a jaw of a gripper for forklifts with clamping panel adjustable in inclination, according to a second embodiment of the prior art;

FIG. 4A is an enlarged-scale view of a detail of FIG. 4;

FIG. 5 is a partial section view according to the plane V-V of FIG. 4;

FIG. 6 is an axonometric view of a gripper for forklifts with clamping panels adjustable in inclination, according to the present invention;

FIG. 8 is a section view according to the plane VIII-VIII of FIG. 7 showing a first detail of FIG. 6 relating to the connecting members that connect the clamping panel to the respective support plate-shaped body;

FIG. 9 is an enlarged scale and partially cut away view of the same first detail shown in FIG. 8;

DETAILED DESCRIPTION

Figures from 6 to 12 show a possible first embodiment of a gripper 10 for forklifts with clamping panels adjustable in inclination according to the present invention.

The gripper 10 comprises a support frame that can be coupled to a forklift and a pair of jaws 11 that are mounted on the support frame in a movable manner with respect to one another between at least one closing position for clamping at least one product to be transported between them and at least one opening position for releasing the product to be transported and vice versa.

For example, the jaws 11 can be mounted on the support frame in a movable manner by sliding through respective rectilinear guide couplings of which, in FIG. 6, are only partly shown the related section bars 12 fixed to the jaw 11 and slidably insertable in corresponding guides fixed to the support frame (not shown).

Figure 1:
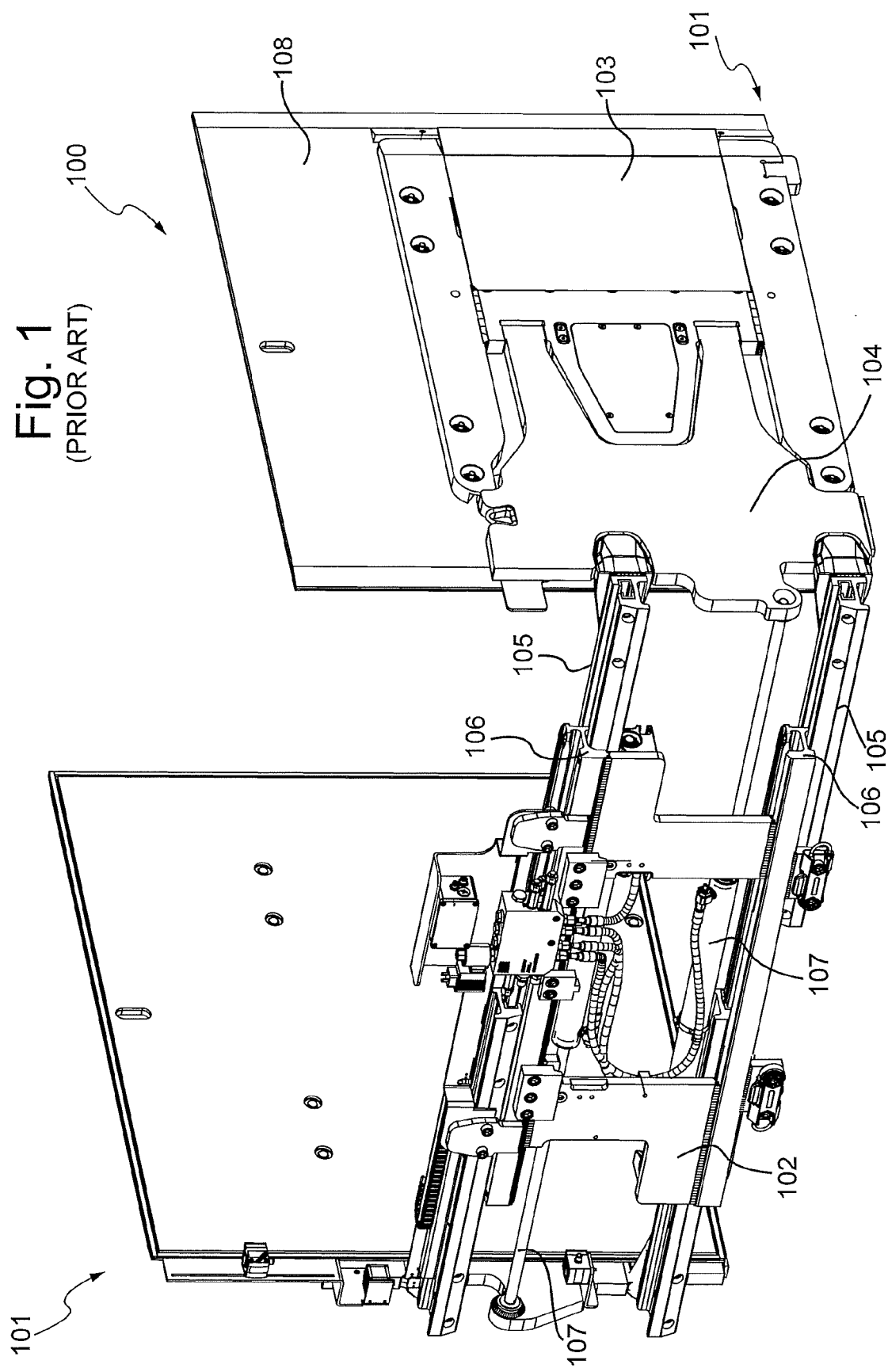
FIG. 1 is an axonometric view of a gripper for forklifts with clamping panels adjustable in inclination, according to a first embodiment of the prior art.
Figure 7:
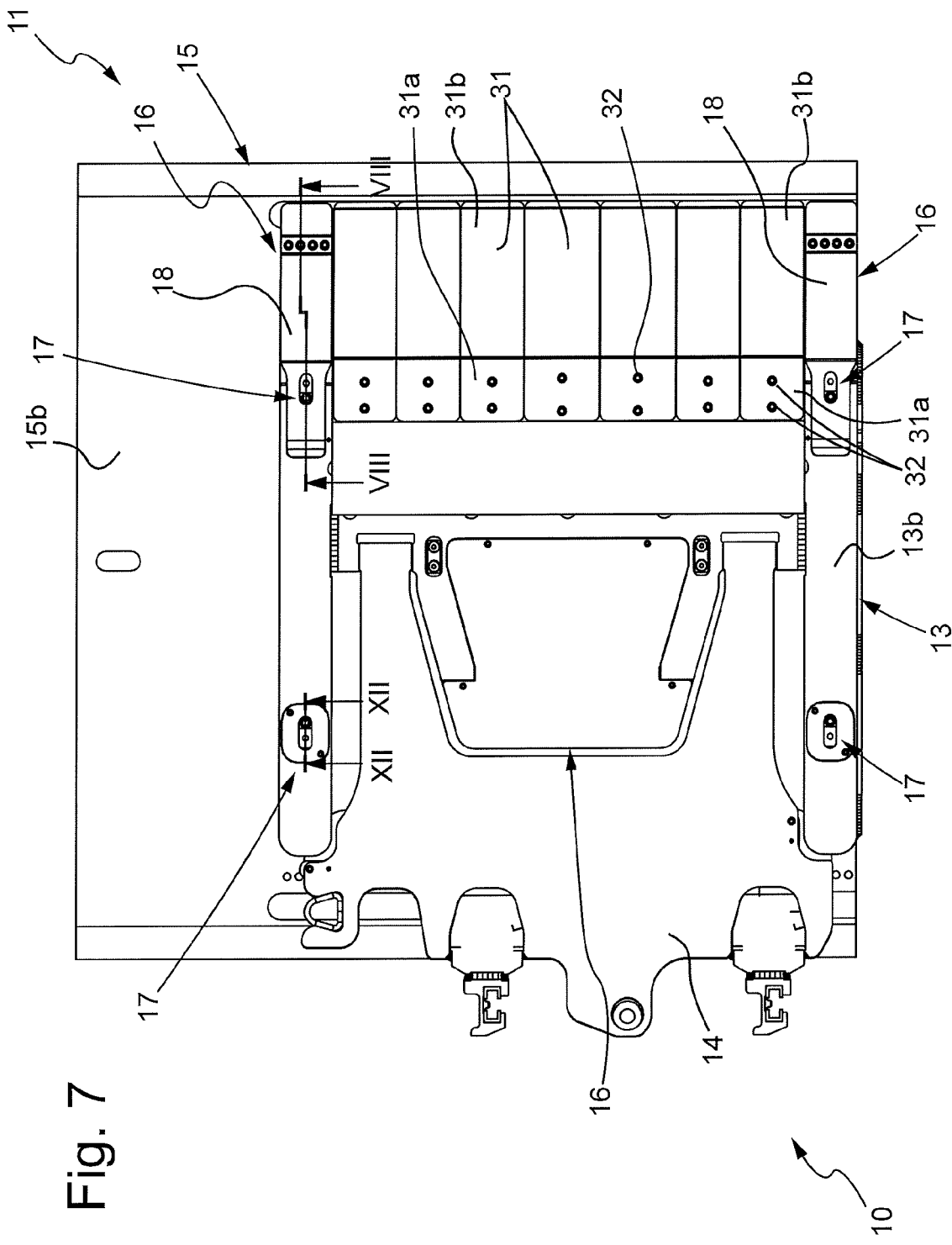
FIG. 7 is a side elevation view of FIG. 6.
Figure 10:
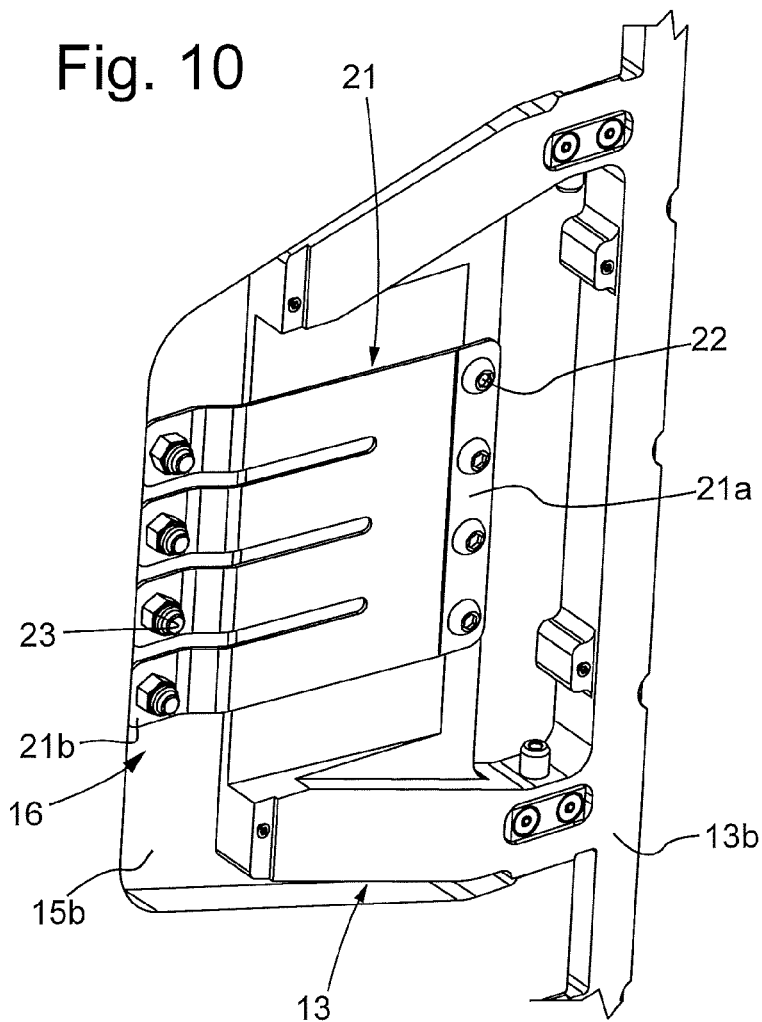
FIG. 10 is an enlarged scale view of a second detail of FIG. 6 relating to the connecting members that connect the clamping panel to the respective support plate-shaped body.
Figure 12:
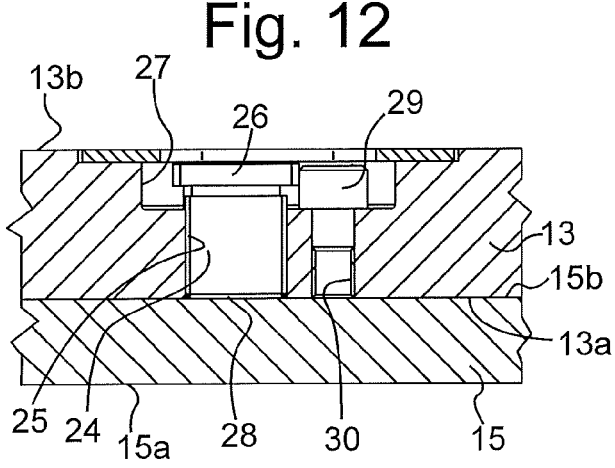
FIG. 12 is a section view according to the plane XII-XII of FIG. 7 illustrating the same detail of FIG. 11.
Figure 11:
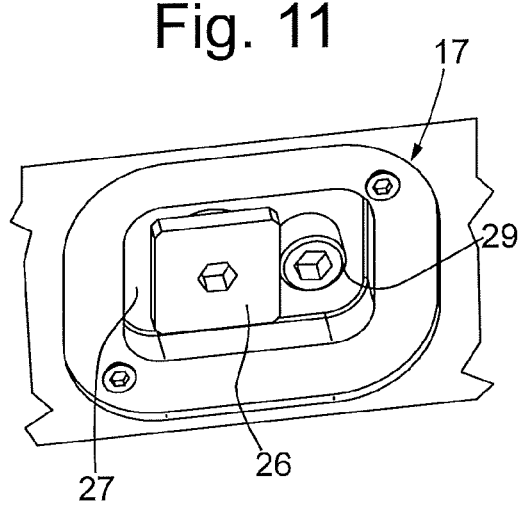
FIG. 11 is an enlarged scale view of another detail of FIG. 6 relating to the adjusting members for adjusting the distance between the clamping panel and the related support plate-shaped body.

It is specified that in the accompanying FIGS. 6 to 12 the gripper 10 is only partially shown, in particular only one of the two jaws 11 is shown, the remaining components (for example, the support frame, the couplings thereto, the related actuators, etc.) being otherwise of a type known to the person skilled in the art and of the type, for example, of those shown in FIG. 1 with reference to the prior art.

Each jaw 11 comprises:

a support plate-shaped body 13 that is coupled to a mounting body 14; the mounting body 14 is in turn coupled in a movable manner to the support frame of the gripper, for example through the rectilinear section bars 12 integral therewith;

a clamping panel 15 that is supported by the support plate-shaped body 13 to which it is connected through connecting members 16.

The term "support plate-shaped body" 13 indicates a body having mainly the shape of a plate, even if not continuous and/or shaped by a plurality of pieces welded together, which defines or otherwise extends mainly on a plane P.

The support plate-shaped body 13 comprises a first face 13a that is oriented towards the other jaw of the pair of jaws forming the gripper and a second face 13b opposite to the first face 13a.

The support plate-shaped body 13 is coupled to the mounting body 14 for example through a known cylindrical hinge coupling.

The clamping panel 15 also has generally the shape of a plate and has a clamping face 15a that is oriented towards the other jaw 11 of the pair of jaws forming the gripper and a mounting face 15b that is opposite to the clamping face 15a. The clamping face 15a is intended to contact the products to be moved. The mounting face 15b is in front of the first face 13a of the support plate-shaped body 13.

According to the present invention, the connecting members 16 are configured to constrain the clamping panel 15 to the respective support plate-shaped body 13 in a substantially rigid manner with respect to translations along directions parallel to the plane P defined by said support plate-shaped body 13 and in an elastic manner with respect to shifts having a shifting component orthogonal to the plane P defined by the support plate-shaped body 13.

Between the support plate-shaped body 13 and the respective clamping panel 15 adjusting members 17 are interposed for adjusting the distance between the clamping panel 15 and the support plate-shaped body 13, or between the respective faces positioned in front of each other, along a direction orthogonal to the plane P defined by the support plate-shaped body 13.

Said adjusting members 17 counteract the elastic action exerted by the connecting members 16.

In particular, the connecting members 16 are arranged to exert an elastic retaining action adapted to retain the clamping panel 15 drawn close to the respective support plate-shaped body 13 with the mounting face 15b of the clamping panel 15 substantially adhering to the first face 13a of the support plate-shaped body 13.

The adjusting members 17 are arranged to adjust the distance between the mounting face 15b of the clamping panel 15 and the first face 13a of the respective support plate-shaped body 13 counteracting the elastic retaining action exerted by the connecting members 16.

The supporting function, performed by the connecting members 16, and the adjusting function, performed by the adjusting members 17, are then separate, although the supporting function is performed to allow the adjusting function.

With particular reference to the first possible embodiment shown in FIGS. 6 to 12, the connecting members 16 comprise at least one leaf body 18 elastically yielding in flexion, having a first portion 18a constrained to the support plate-shaped body 13 and a second portion 18b constrained to the support panel 15.

Advantageously, at least one pair of leaf bodies 18 is provided, which leaf bodies have an elongated longitudinal development that extends (in direction) between the rear and front ends of the jaw 11, the rear end being the one oriented towards the mounting frame of the gripper and the front end being the free one.

The first portion 18a and the second portion 18b of each leaf body 18 are mutually angled and are partially resting on corresponding abutment surfaces obtained in the support plate-shaped body 13.

The clamping panel 15 has a greater extension than that of the respective plate-shaped body 13 from which it projects with respective edges, in particular with a respective front edge.

Each leaf body 18 has the first portion 18a constrained to the support plate-shaped body 13 at the second face 13b thereof and the second portion 18b constrained to the mounting face 15b of the clamping panel 15 at the front edge thereof that projects relative to the support plate-shaped body 13.

In particular, the first portion 18a is hinged around a respective pin 19 fixed to the support plate-shaped body 13 and housed in a corresponding seat obtained therein, while the second portion 18b is fixed to the clamping panel 15 through respective screws 20.

Advantageously, the connecting members 16 can comprise one or more supplementary leaf bodies 21, also elastically yielding in flexion. Said supplementary leaf bodies 21 are, for example, provided in a substantially central position of the support plate-shaped body 13; each of them has a first portion 21a constrained, for example by means of screws 22 to the support plate-shaped body 13 at its second face 13b and a second portion 21b constrained, for example by means of screws 23, to the clamping panel 15 at its mounting face 15b.

As a whole, then, the connecting members 16 connect the clamping panel 15 to the respective support plate-shaped body 13 and allow the clamping panel 15 to undergo, within determined limits, an elastic displacement towards or away from the respective support plate-shaped body 13 so as to make it possible to change the position and in particular the overall inclination of the clamping panel 15.

The adjusting members 17 comprise at least one spacer that is coupled in an adjustable manner to one of said support plate-shaped body 13 and the respective clamping panel 15 and that has a portion that can be interposed between the support plate-shaped body 13 and the clamping panel 15 and making a resting contact with the mounting face 15b of the clamping panel 15 or with the first face 13a of the support plate-shaped body 13, respectively, counteracting the elastic action exerted by the connecting members 16.

The adjusting members 17 comprise, advantageously, at least one locking element for temporarily locking said at least one spacer.

Preferably, the adjusting members 17 comprise a plurality of said spacers and respective locking elements distributed along the extension of the support plate-shaped body 13, advantageously at the front and rear ends thereof.

In the embodiment shown in the accompanying figures, the adjusting members 17 comprise a plurality of spacers each of which consists of a respective threaded pin 24 that extends parallel to a direction orthogonal to the plane P defined by the support plate-shaped body 13 and is engaged in a corresponding threaded through hole 25 obtained in the support plate-shaped body 13. Each threaded pin 24 has, at an axial end, a maneuvering head 26 housed in a corresponding seat 27 obtained at the second face 13b of the support plate-shaped body 13 and, at the axial end opposite the maneuvering head 26, an abutment surface 28 providing a resting contact with the mounting face 15b of the clamping panel 15.

For each threaded pin 24, a respective locking element is provided, consisting of a corresponding locking screw 29 screwed in a removable manner in a corresponding threaded hole 30 obtained in the support plate-shaped body 13 in such a position as to prevent by hindrance the rotation of the respective threaded pin 24, in particular by interference of the related heads.

Each jaw 11 further comprises at least one covering body 31 that restores the continuity between the support plate-shaped body 13 and the respective clamping panel 15 at least at the edge of the clamping panel projecting relative to the support plate-shaped body in front position.

The covering body 31 is advantageously also elastically yielding in flexion.

The covering body 31 is arranged to cover the space between the mounting face 15b of the clamping panel 15 and the first face 13a of the support plate-shaped body 13 joining the mounting face 15b of the clamping panel 15 to the second face 13b of the support plate-shaped body 13.

With particular reference to the accompanying figures, there is provided a plurality of covering bodies 31 arranged to join the mounting face 15b of the clamping panel 15 to the second face 13b of the respective support plate-shaped body 13 at the front edge of the clamping panel projecting beyond the support plate-shaped body.

Each covering body 31 consists of an elastically yielding leaf with elongated longitudinal development that extends (in direction) between the rear and front ends of the jaw 11.

Each covering body 31 has a respective first portion 31a fixed to the support plate-shaped body 13 by means of respective screws 32 and a second portion 31b resting on the mounting face 15b of the clamping panel 15.

Figure 13:
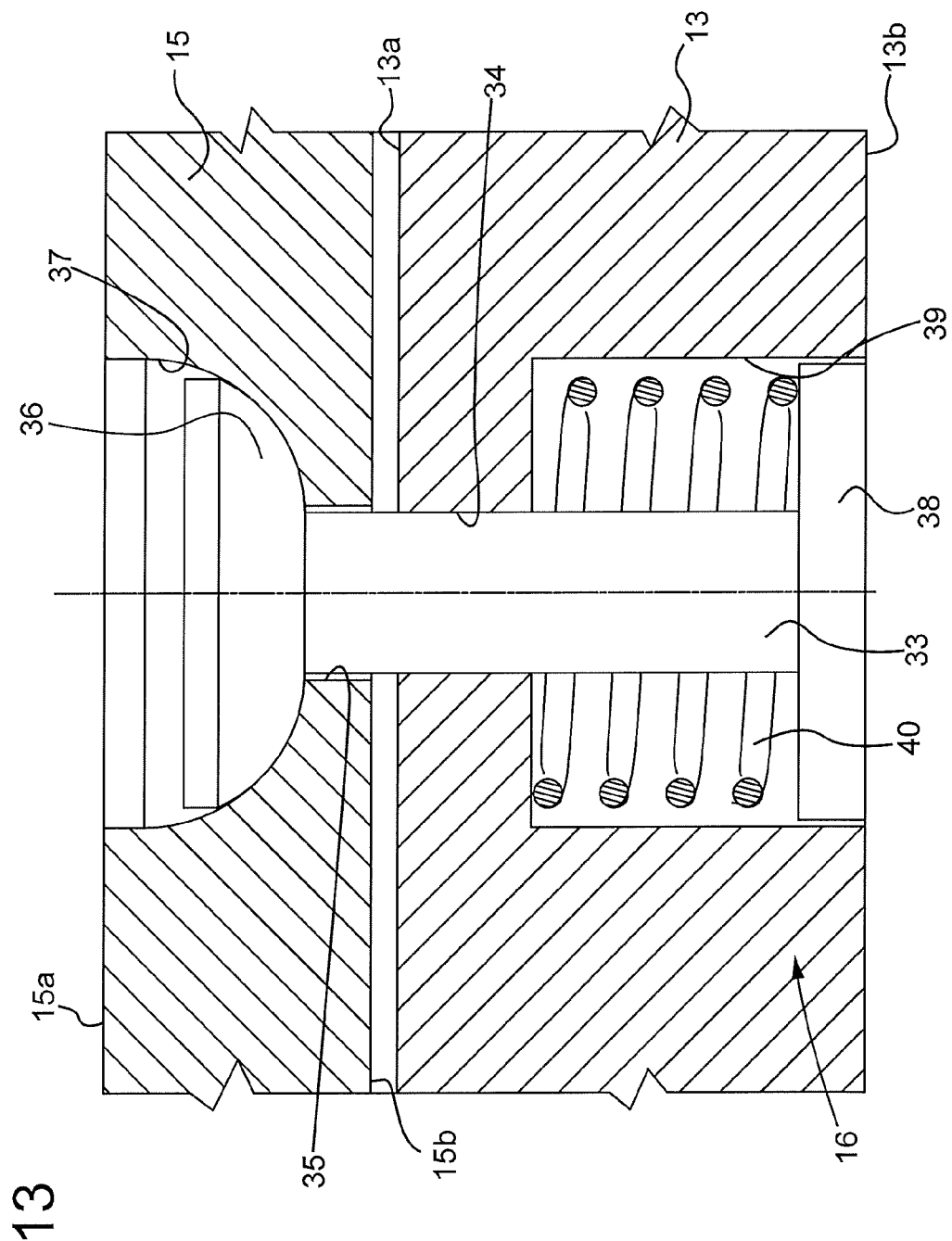
FIG. 13 is a section that shows schematically an alternative embodiment of the connecting members that connect the clamping panel to the respective support plate-shaped body of a jaw of a gripper for forklifts according to the present invention.

FIG. 13 schematically shows a second possible embodiment of the gripper according to the present invention.

This second embodiment differs from the first one solely by the embodiment of the connecting members 16.

In fact, the connecting members comprise at least one pair of pins 33, each of which extends along a direction orthogonal to the plane P defined by the support plate-shaped body 13 and that is inserted with play in corresponding through holes 34 and 35 obtained respectively in the support plate-shaped body 13 and in the clamping panel 15.

Each pin 33 has a first head 36, advantageously semi-spherical, resting on the bottom of a corresponding seat 37 obtained in the clamping panel 15 (or in the support plate-shaped body 13) and a second head 38 housed in a corresponding cavity 39 obtained in the support plate-shaped body 13 (or in the clamping panel 15) with the interposition of at least one spring 40. The spring 40 is guided by the pin 33 and acts between the second head 38 thereof and the support plate-shaped body 13 to exert an elastic retaining action adapted to retain the clamping panel 15 drawn close to the support plate-shaped body 13 with the mounting face 15b of the clamping panel 15 adhering to the first face 13a of the support plate-shaped body 13.

In this embodiment, the adjusting members 17 and other details such as the covering body 31 are similar to those shown and described with reference to the first embodiment.

In any case the connecting members 16 are adjustable, in particular to adjust the elastic preload of the respective elastically yielding elements.

The operation of the present invention is immediately understandable for the person skilled in the art in light of the accompanying figures and of the above description.

In short, if it is necessary to change the inclination of the clamping panel 15 of a jaw 11 so as to restore the parallelism with respect to the clamping panel 15 of the other jaw of the gripper, it is sufficient to remove or otherwise loosen the locking elements (locking screws 29) of the adjusting members 17 and act thereon to change the distance between the clamping panel 15 and the respective support plate-shaped body 13.

In particular, by screwing or unscrewing the threaded pins 24 with the aid of a wrench, the distance between the clamping panel 15 and the respective support plate-shaped body 13 is adjusted. The displacement of the clamping panel 15 is made possible by the elasticity of the connecting bodies 16 whose elastic action maintains the mounting face 15*b* of the clamping panel 15 in contact with the abutment surface 28 of the threaded pins 24.

The covering bodies 31, thanks to their elasticity, join the mounting face 15*b* of the clamping panel 15 to the second face 13*b* of the support plate-shaped body 13 closing the space that is generated between the clamping panel 15 and the respective support plate-shaped body 13 in particular at their front end.

The adjustment can be carried out on each of the adjusting members 17 independently from the others which, once the adjustment is complete, are locked again by the engagement with the respective locking members.

The gripper according to the present invention has the advantage of making it possible to adjust the position and in particular the inclination of the respective clamping panels in a simple and rapid manner with a structure having reduced dimensions and weights.

In particular, in the gripper according to the present invention the supporting function of the clamping panel and the adjusting function of the position of the clamping panel are performed respectively by the connecting members and by the adjusting members, the former allowing, thanks to the elastic connection provided by them, the action of the latter.

It is thus possible to act on the individual adjusting members independently from the others and with no need to loosen any structural connection member, as occurs for example in the solutions according to the prior art.

In addition, the coverage of the space that is created between the clamping panel and the respective support plate-shaped body at the front edge thereof is ensured, thus avoiding possible damages to the load.

The gripper for forklifts with clamping panels adjustable in inclination thus conceived is susceptible to numerous modifications and variants, all of which are within the scope of the invention; moreover, all details can be replaced by technically equivalent elements. In practice, the materials used, as well as the dimensions, can be of any type according to the technical requirements.

The invention claimed is:

1. A gripper for forklifts comprising a support frame that can be coupled to a forklift and a pair of jaws that are mounted on said support frame in a movable manner with respect to one another between at least one closing position for clamping at least one product to be transported between them and at least one opening position for releasing said product to be transported and vice versa, wherein each of said jaws comprises:
   a support plate-shaped body that is coupled to a mounting body, and the mounting body is coupled in a movable manner to said support frame, wherein said support plate-shaped body comprises a first face that faces the other jaw of said pair of jaws and a second face opposite said first face,
   a clamping panel that is supported by said support plate-shaped body to which it is connected with connecting members, wherein said clamping panel comprises a clamping face that faces the other jaw of said pair of jaws and a mounting face that is opposite said clamping face and that faces said first face of said support plate-shaped body,
   wherein said connecting members are configured to elastically bias said support plate-shaped body toward said clamping panel to constrain said clamping panel to the respective said support plate-shaped body in a substantially rigid manner with respect to translations along directions parallel to the plane defined by said support plate-shaped body and in an elastic manner with respect to shifts having a shifting component orthogonal to the plane defined by said support plate-shaped body,
   adjusting members being interposed between said support plate-shaped body and said clamping panel of each of said jaws for adjusting the distance between said clamping panel and said support plate-shaped body along said direction orthogonal to the plane defined by said support plate-shaped body, said adjusting members counteracting the elastic action exerted by said connecting members.

2. The gripper according to claim 1, wherein said connecting members are arranged for exerting an elastic retaining action for retaining said clamping panel drawn close to said support plate-shaped body with said mounting face of said clamping panel substantially adhering to said first face of said support plate-shaped body, wherein said adjusting members are arranged for adjusting the distance between said mounting face of said clamping panel and said first face of said support plate-shaped body counteracting the elastic retaining action exerted by said connecting members.

3. The gripper according to claim 1, wherein said connecting members comprise at least one elastically yielding leaf body having a first portion constrained to said support plate-shaped body and a second portion constrained to said clamping panel.

4. The gripper according to claim 3, wherein said clamping panel has an edge projecting with respect to said support plate-shaped body, wherein said at least one elastically yielding leaf body has said first portion that is constrained to said support plate-shaped body at said second face of said support plate-shaped body and said second portion constrained to said projecting edge of said clamping panel at said mounting face thereof.

5. The gripper according to claim 4, wherein said first portion of said at least one leaf body is hinged or fixed to said support plate-shaped body and wherein said second portion of said at least one leaf body is fixed or hinged to said clamping panel.

6. The gripper according to claim 4, wherein said connecting members comprise at least two or more of said elastically yielding leaf bodies.

7. The gripper according to claim 1, wherein said connecting members comprise at least one pair of pins, each of which extends along a direction orthogonal to the plane defined by said support plate-shaped body and that is inserted with clearance into corresponding through-holes obtained in said support plate-shaped body and in said clamping panel, wherein each of said pins has a first head resting on the bottom of a corresponding seat obtained in one of said clamping panel and of said support plate-shaped body and a second head housed in a corresponding cavity obtained in the other of said clamping panel and of said support plate-shaped body with interposition of at least one spring operating between said second head and said clamping panel or said support plate-shaped body for exerting said elastic retaining force for retaining said clamping panel drawn close to said support plate-shaped body with said mounting face of said clamping panel adhering to said first face of said support plate-shaped body.

8. A gripper according to claim 1, wherein an elastic preload applied by said connecting members is adjustable.

9. The gripper according to claim 1, wherein said adjusting members comprise at least one spacer that is coupled in an adjustable manner to one of said support plate-shaped body and of said clamping panel and that has a portion that can be interposed between said support plate-shaped body and said clamping panel and making a resting contact with said mounting face of said clamping panel or with said first face of said support plate-shaped body, respectively, counteracting the elastic action exerted by said connecting members.

10. The gripper according to claim 9, wherein said adjusting members comprise at least one locking member for temporarily locking said at least one spacer.

11. The gripper according to claim 9, wherein said at least one spacer comprises a threaded pin extending parallel to a direction orthogonal to the plane defined by said support plate-shaped body, is engaged in a corresponding threaded through hole obtained in said support plate-shaped body and has, at an axial end thereof, a maneuvering head housed in a corresponding seat obtained at said second face of said support plate-shaped body and, at the axial end opposite said maneuvering head, an abutment surface making said resting contact with said mounting face of said clamping panel.

12. The gripper according to claim 10, wherein said at least one locking element comprises for each of said threaded pins a corresponding locking screw screwed in a removable manner to said support plate-shaped body in such a position to prevent, by hindrance, the rotation of the respective threaded pin.

13. The gripper according to claim 9, further comprises a plurality of said spacers distributed along the extension of said support plate-shaped body.

14. The gripper according to claim 1, wherein each of said jaws of said pair of jaws comprises at least one covering body that covers the space between said mounting face of said clamping panel and said first face of said support plate-shaped body joining said mounting face of said clamping panel to said second face of said support plate-shaped body at at least one edge of said clamping panel projecting with respect to said support plate-shaped body, wherein said at least one covering body is elastically yielding and has a first portion fixed to said support plate-shaped body or to said clamping panel and a second portion resting on said mounting face or on said second face, respectively.

15. The gripper according to claim 1, wherein said support plate-shaped body directly contacts said clamping panel.

16. The gripper according to claim 1, wherein said adjusting members comprise at least one spacer that is positioned within said support plate-shaped body and a first end of said at least one spacer abuts clamping panel.

17. The gripper according to claim 1, wherein a second end of said at least one spacer abuts one of said connecting members.

* * * * *